United States Patent [19]

Gsell et al.

[11] Patent Number: 5,019,260

[45] Date of Patent: * May 28, 1991

[54] FILTRATION MEDIA WITH LOW PROTEIN ADSORBABILITY

[75] Inventors: Thomas C. Gsell, Glen Cove; Isaac Rothman, Brooklyn, both of N.Y.

[73] Assignee: Pall Corporation, Glen Cove, N.Y.

[ * ] Notice: The portion of the term of this patent subsequent to Aug. 8, 2006 has been disclaimed.

[21] Appl. No.: 447,415

[22] Filed: Dec. 7, 1989

Related U.S. Application Data

[63] Continuation-in-part of Ser. No. 945,569, Dec. 23, 1986, Pat. No. 4,906,374.

[51] Int. Cl.$^5$ .............................................. B01D 71/34
[52] U.S. Cl. ............................. 210/490; 210/500.42; 210/654; 427/245; 427/393.5; 428/315.5
[58] Field of Search ............... 210/490, 500.42, 638, 210/654, 655, 500.38; 427/244–246, 302, 322, 393.5; 428/29, 304.4, 315.5, 315.7, 315.9, 475.5; 521/27, 53–55, 134, 139, 901, 905

[56] References Cited

U.S. PATENT DOCUMENTS

| | | | |
|---|---|---|---|
| 4,855,163 | 8/1989 | Joffee et al. | 427/244 |
| 4,886,836 | 12/1989 | Gsell et al. | 521/53 |
| 4,906,374 | 3/1990 | Gsell | 210/490 |
| 4,968,533 | 11/1990 | Gsell | 210/490 |

Primary Examiner—W. Gary Jones
Attorney, Agent, or Firm—Leydig, Voit & Mayer

[57] ABSTRACT

A porous polymeric medium having a low affinity for amide group-containing and adjuvant-containing materials is provided comprising a porous polyvinylidene difuoride substrate and a surface-modifying polymeric material having a low affinity for amide group-containing materials formed in situ at and covalently bonded to the surface of the porous polyvinylidene difuoride substrate, the surface-modifying polymeric material being formed from a monofunctional monomer having at least one hydroxyl group. Another embodiment that provides a porous polymeric medium having a low affinity for amide group-containing materials employs a supplemental monomer in combination with the monofunctional monomer having at least one hydroxyl group to form the surface-modifying polymeric material. The supplmental monomer or comonomer used is one which, when formed as a homopolymer, has a high affinity for amide group-containing materials.

29 Claims, No Drawings

FILTRATION MEDIA WITH LOW PROTEIN ADSORBABILITY

This application is a continuation-in-part application of U.S. patent application Ser. No. 06/945,569, filed Dec. 23, 1986, now U.S. Patent No. 4,906,374.

TECHNICAL FIELD

The present invention relates to porous media having a low affinity for amide-containing materials. More particularly, the present invention is directed to microporous polymeric media useful as filtration membranes having modified surfaces which show a low propensity to adsorb proteinaceous as well as certain adjuvant materials.

BACKGROUND ART

In the medical, pharmaceutical and biological fields as well as the food and beverage industries, including those involving manufacturing, research, clinical testing and processing, fluids are commonly tested or filtered which contain proteinaceous materials. Many of the media used in diagnostic testing or filtration provide adequate performance with respect to retention of materials sought to be retained, such as solid or gelatinous materials, including biological organisms, cell debris and other particulate matter. Commonly, such media used for filtering proteinaceous material-containing fluids also provide rapid flow rates when initially placed in service by virtue of low pressure drops across the membranes. Many of these materials, such as cellulose esters, however, exhibit poor hydrolytic stability and tend to decompose slowly when subjected to continuous use and particularly when exposed to conditions of steam sterilization. There is a tendency by some media, particularly cellulose esters such as cellulose acetate and cellulose nitrate, to decompose as a result of prolonged exposure to solvents or biological materials. In addition, some of these materials tend to be brittle and cellulose nitrate is flammable.

Other media, such as polyamides, particularly nylon, exhibit generally good hydrolytic stability, relatively low flammability and desirable physical properties, such as high strength and flexibility. The polyamides, particularly nylon 66, demonstrate high retention of materials sought to be retained, usually resulting from precise manufacturing control of absolute pore ratings. In many applications, polyamide media are employed in the form of membranes which exhibit low pressure drops across the membrane. However, when such applications involve filtration or passage of solutions containing proteinaceous materials, the pressure differentials across the filtration media frequently increase during use because continued contact of such membranes with proteinaceous materials results in the pores of the membrane being plugged with sorbed proteinaceous material and performance thereby is adversely affected. In many instances, the blockage is irreversible and a costly membrane must be discarded. Thus, a membrane which in most respects is quite suitable for the intended purpose is rendered useless by an undesirable adsorption of proteinaceous material. In some instances, the retained protein may be desired but is rendered unusable and may, therefore, represent a costly loss.

Certain filtration media also tend to adsorb from solutions certain non-proteinaceous adjuvants, such as color and flavor agents in foods and beverages, polyphenols in beer, and certain preservatives in pharmaceutical preparations. Thus, although nylon possesses many of the positive properties enumerated above which make it an excellent material for applications in which a liquid is to pass through the pores of the material (for example in filtration or diagnostic applications), it is also a material which demonstrates an affinity not only for proteinaceous materials but also for certain color agents, polyphenols and polar preservatives. Thus, even if the sorption of proteinaceous material were overcome, nylon filtration media would still possess the drawback of having a strong affinity for the aforementioned adjuvants.

DISCLOSURE OF THE INVENTION

The present invention is directed to porous polymeric media, preferably in membrane form and microporous in nature, useful as filtration media or as diagnostic media. The present invention provides a porous, preferably microporous, polymeric medium having a low affinity or sorbability, particularly adsorbability, for amide group-containing materials, such as proteinaceous materials, and a porous, preferably microporous, polymeric medium having a low affinity for amide group-containing materials and additionally a low affinity for adjuvants such as coloring agents, polyphenols and preservatives which are either added to or are naturally present in solutions being treated or analyzed. These include a porous, preferably microporous, polymeric substrate or matrix, which is typically one having a high affinity or sorbability for amide group-containing materials, particularly proteinaceous materials. The surface of the porous polymeric substrate is modified to provide a low affinity for amide group-containing materials, particularly proteinaceous materials. The surface modification is accomplished by grafting of a second polymeric material rich in pendant hydroxyl groups and having a low affinity for amide group-containing materials at the surface of the polymeric substrate.

When first placed into use, the porous polymeric media of the present invention exhibit desirable filtration characteristics which are quite similar to those of the untreated polymeric substrate from which they are prepared. Thus, unlike many chemically treated porous polymeric media, the media of the present invention commonly demonstrate low levels of extractable contaminants which are comparable to the low levels of untreated membranes. This is important both to manufacturers and users of such materials to whom it is undesirable to employ additional treatment steps prior to use. The media of the present invention also demonstrate fluid flow behavior when first placed into use, particularly with respect to flow rates and pressure drops, similar to or substantially the same as untreated media formed from the same polymeric substrate. However, as compared to the behavior of untreated porous substrates, because of the greatly reduced adsorption of proteinaceous material, the fluid flow properties of the porous polymeric media of the present invention change only gradually with use due to the media becoming blocked with proteinaceous material. Because of the low affinity for proteinaceous material, the porous polymeric media of the present invention largely eliminate the unwanted loss of protein from a product stream. When polyvinylidene difluoride (PVDF) is used as a substrate in the present invention, the media produced therefrom demonstrate a low affinity for small molecular adjuvants such as flavor and color bodies, polyphenols and certain polar, particularly cationic, preservatives. Therefore, PVDF media prepared in accordance with the present invention demonstrate both a low affinity for the materials noted immediately above and for amide group-containing materials.

The surface-modifying polymer, or second polymeric material, which is formed at the surface of the polymeric substrate is a non-crosslinked polymeric material having pendant hydroxyl moieties. It is formed and covalently bound to the porous polymeric substrate by treating the polymeric substrate with a solution of a suitable hydroxyl-containing monomer and thereafter exposing the treated substrate to ionizing radiation, preferably gamma radiation. Polymerization of the monomer and grafting to the polymeric substrate results. The ionizing radiation employed includes short wavelength ultraviolet radiation or gamma radiation, the latter being particularly preferred when PVDF substrates are used. Preferred as monomers to form the surface-modifying polymers are hydroxyl-containing vinylic type monomers. When PVDF is employed as the substrate, the hydroxyl containing vinylic type monomers may be copolymerized with a minor amount of ethylenically unsaturated monomers, homopolymers of which exhibit a high affinity for amide group-containing materials, particularly proteinaceous materials.

BEST MODES FOR CARRYING OUT THE INVENTION

The present invention is directed to porous polymeric media having low affinity for or adsorbability of amide group-containing materials, such as proteinaceous materials, and also to those media which additionally have a low affinity for adjuvants that are typically small molecules such as color and food bodies, polyphenols and certain polar preservatives, which are capable of diffusing through a coating. These media include a porous polymeric substrate or matrix that has been modified at its surface with a second polymeric material rich in pendant hydroxyl groups to provide a low affinity for amide group-containing materials and particularly proteinaceous materials. The affinity of the surface-modified polymeric medium for such amide group-containing materials is much lower than the polymeric substrate from which the medium is formed. The term "proteinaceous materials", as used herein, includes proteins and amino acids and may include substances with sterically accessible amide moieties or substances in which the proportion of amide moieties to other moieties is high. Terms such as "surface", "polymeric substrate surface", "membrane surface" or like terms, used in the singular or plural, are intended herein to include not only the gross surfaces, i.e., the external or outer surfaces, such as those which are exposed to view, but also the internal surfaces or those surfaces which define the pores of the polymeric substrate or medium, that is, the substrate or membrane surface is that portion of the polymeric substrate or membrane medium which is capable during use of being contacted by a fluid, particularly a liquid. As distinguished from the "polymeric substrate surface area", which refers to the area of both internal and external surfaces, the exposed planar dimensional area of the material is herein referred to as the "polymeric substrate area".

The media of the present invention may be prepared from polymeric substrates which are capable of forming radical species at their surfaces when exposed to ionizing radiation and do not react adversely with the solvents used in the monomer solution. Particularly suited are polymeric substrates having C—H bonds available for abstraction of H atoms and radical formation under the influence of ionizing radiation. When intended as a filtration medium, where passage of liquid through the medium will be encountered, those materials which exhibit desirable flow properties will generally be employed as polymeric substrates. Although, liquophilic substrates are preferred and hydrophilic substrates are particularly preferred when nylon is employed as the polymeric substrate, when PVDF is used as the substrate, it typically is hydrophobic prior to surface-modifying treatment according to the present invention. However, the same surface-modification resulting from a second polymeric material which imparts a low affinity for amide group-containing materials also imparts liquophilicity, typically hydrophilicity to the resulting surface-modified medium. Thus, while a PVDF medium treated in some manner to render it liquophilic or hydrophilic could be used in the present invention, considering the cost and availability of such materials and the fact that the surface modification of the present invention imparts hydrophilicity to the medium, hydrophilic substrates are unnecessary.

Liquophilicity, as used herein, refers to the wettability of the substrate or membrane medium by the liquid(s) with which it is contacted. The wettability or liquophilicity of a solid structure, e.g., a membrane, is a function of that structure's critical surface energy and the surface tension of the applied liquid. If the critical surface energy is at least as high as the surface tension of the liquid, the liquid will spontaneously wet the solid structure. For example, a microporous membrane having a critical surface energy of 72 dynes/cm or higher will be wetted by water which has a surface tension of 72 dynes/cm, i.e., it is hydrophilic.

The capability of a porous structure (substrate, medium, membrane, etc.) to be wetted by a liquid can be determined by placing a drop of liquid on the porous structure. The angle of contact provides a quantitative measure of wetting. A very high angle of contact indicates poor wetting, while a zero angle of contact defines complete or perfect wetting. The porous media having a low affinity for amide group-containing materials according to the subject invention are characterized, preferably, as being readily or spontaneously wetted by the applied liquid and have a low angle of contact with the applied liquid. Indeed, when a drop of a liquid(s) used with the porous structures of the present invention is placed on a spontaneously wettable or liquophilic microporous medium, the drop of liquid penetrates and wets the medium, effectively providing a zero angle of contact therewith.

Among the porous polymeric substrates which are typically employed in the present invention are melt spun webs and, preferably, because of their fine and uniform pore structure, membranes which normally exhibit a high affinity toward amide group-containing materials, particularly proteinaceous materials. When PVDF is used as the substrate in the present invention, materials in the form of continuous phase membranes such as non-fibrous membrane are employed.

Examples of materials suitable as the porous polymeric substrate are polyamides, fluoropolymers such as polyvinylidene difluoride (PVDF) and polytetrafluoroethylene (PTFE), polysulfones, and polyacrylonitrile. Preferred for use in the present invention are fluoropolymers, such as polyvinylidene difluoride and polyamides, such as the nylons, among which the preferred nylons include polyhexamethylene adipamide, poly-ε-caprolactam, polyhexamethylene sebacamide, poly-7-aminoheptanoamide, or polyhexamethylene azeleamide, with polyhexamethylene adipamide (nylon 66) and PVDF are most preferred. Particularly preferred as a nylon substrate are skinless, substantially alcohol-insoluble, hydrophilic polyamide membranes. These membranes are also characterized as having a ratio of methylene $CH_2$:amide NHCO within a range of about 5:1 to about 7:1.

The present invention may also use polymeric substrates which exhibit a lower affinity for proteinaceous materials. Examples of such materials would include cellulose esters, such as cellulose nitrate, polyolefins, such as polyethylene and polypropylene, polyesters, such as polyethylene terephthalate and polybutylene terephthalate.

Membranes employed as substrates, typically have pore diameter ranges of about 0.01 to about 10 microns, preferably about 0.01 to about 5 microns, most preferably about 0.01 to about 3 microns. When PVDF is employed as the substrate, the pore rating is suitably about 0.01 to about 1 micron. The porous polymeric media of the present invention have thicknesses of about 0.0005 to about 0.050 inch and, when employed as filtration media, suitably have thicknesses of about 0.0005 to about 0.020 inch (about 0.0125 to about 0.50 mm), typically about 0.001 to about 0.010 inch (about 0.0255 to about 0.255 mm). Suitable thicknesses for PVDF are about 0.001 to about 0.01 inch. The voids volume (percentage voids) of materials primarily intended as filtration media are suitably about 30 to about 95 percent, typically about 50 to about 90 percent. Preferred as the porous polymeric nylon substrates of the present invention are the hydrophilic membranes described in U.S. Pat. No. 4,340,479, assigned to Pall Corporation and incorporated herein by reference. A membrane material of this description which is particularly useful for the present invention is available from Pall Corporation under the trademark ULTIPOR $N_{66}$.

The present invention also includes those media in which a support web at least partially penetrates the porous polymeric medium. Preferably the support web is completely embedded within the porous polymeric medium. Suitable materials for use as the support web are polyesters.

The second polymeric material, which has a low affinity for proteinaceous materials, may be any polymeric material which may be formed in situ on the polymeric substrate from a monofunctional unsaturated monomer rich in pendant hydroxyl groups or groups capable of reacting to form hydroxyl groups, particularly after or upon formation of the second polymeric material, and which is capable of undergoing polymerization and covalently bonding to the substrate under the influence of ionizing radiation. Terms such as "monofunctional", "functional groups", "functionality", as used herein in describing monomers suitable for use in the present invention, refer to those unsaturated functional groups which are believed to be responsible for polymerization and bonding to the polymeric substrate. While not wishing to be bound to any particular theory, it is believed that under the influence of ionizing radiation unsaturated bonds in the monomer molecules enter into polymerization and grafting reactions with other monomers and into reactions which form a non-crosslinked polymer bonded to the substrate. Particularly preferred is vinylic or ethylenic unsaturation. Monomers suitable for use in the present invention, to provide the media with a low affinity for amide group-containing materials, have but a single functional group, that is, a single unit of unsaturation. However, while those monomers preferred in the present invention have a single hydroxyl group, those compounds with a plurality of hydroxyl groups are also suitable. By "hydroxyl" groups are meant those OH groups which are characteristic of alcohols and do not include OH groups present in combination with other groups, such as the COOH (carboxyl) group in carboxylic acids. The pendant hydroxyl groups, or groups capable of forming same, required in the monomer and second or surface-modifying polymeric material are in large part responsible for the low protein sorbing characteristics of the invention. Suitable as second polymeric materials are those materials which provide in the modified medium a low adsorption of proteinaceous material as measured by the Bovine Serum Albumin Adsorption Test, discussed in greater detail below. According to this test, polymers which adsorb less than 100 micrograms/$cm^2$ of proteinaceous material are considered, for purposes of the present invention, to have a low affinity for proteinaceous materials, and materials adsorbing less than 35 micrograms/$cm^2$ are preferred, with those media adsorbing less than 5 micrograms/$cm^2$ being most preferred. Conversely, for purposes of the present invention, polymers which adsorb more than about 100 micrograms/$cm^2$ of proteinaceous material are considered to have a high affinity for proteinaceous material.

The second polymeric material forming the modified surface of the medium is derived from monomers having hydroxyl groups and moieties characterized by having one polymerizable unit of unsaturation, preferably ethylenic or vinylic unsaturation. However, preferred compounds may also include other groups, such as carboxylate moieties, hydroxy or hydroxy-forming substituted acrylate and methacrylate esters being exemplary. Particularly preferred as monomers are hydroxyalkyl acrylates in which the "alcoholic" or hydroxyl-containing portion of the molecule (as opposed to the portion of the molecule "derived" from a carboxylic acid) constitutes a substituted lower alkyl group having from 2 to 5 carbon atoms, preferably from 2 to 3 carbon atoms. The substituent is preferably a hydroxyl group, although a substituent capable of reacting to form a hydroxyl group may be used. When the latter type of monomer is employed, a reaction can be performed after polymerization to convert the substituent to a hydroxyl group. Mixtures of monomers may also be used. The hydroxyl-containing monomers and/or the hydroxyl-containing polymeric materials formed therefrom which are most preferred are those in which the hydroxyl group is pendant. By "pendant" is meant the group is not attached to a carbon atom which forms part of the polymer's backbone but is bound to a carbon atom that is separated from the backbone as, for example, a branching carbon atom.

Exemplary of preferred monomers are such compounds as 2-hydroxyethyl acrylate, 2-hydroxyethyl methacrylate, 3-hydroxypropyl acrylate, and 3-hydroxypropyl methacrylate. These compounds are available commercially from Rohm and Haas Chemical Company under the trademark ROCRYL and are designated ROCRYL 410, 400, 430, and 420, respectively. The hydroxypropyl acrylate and methacrylate esters generally available commercially are mixtures of the 3-hydroxyprop-2-yl and 2-hydroxypropyl isomers. Although in some instances the individual ester isomer may be preferred, for most purposes commercial mixtures of 3-hydroxyprop-2-yl and 2-hydroxypropyl acrylate or methacrylate are suitable. Alternatively, these and other compounds suitable for use in the present invention may be obtained either from commercial sources or may be prepared by reactions and techniques known to the organic chemist.

When the substrate is PVDF, the second or surface modifying polymeric material may be formed not only from the monomers described above used alone but also in combination with a supplemental monomer present in minor amounts. Useful as the supplemental monomers, or comonomers are materials whose homopolymers have high affinity for amide containing materials. These monomers are ethylinically or vinylically unsaturated and fall generally into, but not limited to, either of two categories: (1) they are ionic or readily ionizable in aqueous solution or (2) they contain hydrophobic groups. Examples of the first category include unsaturated acids such as carboxylic acids, as for example, acrylic and methacrylic acids; sulfonic acids, as for example, vinyl sulfonic acid; phosphonic acids, as for example, vinyl and styrene phosphonic acids. The second category includes styrenic materials and alkyl esters of unsaturated acids, such as alkyl acrylates and methacrylates, the alkyl group being a hydrophobic group having 1 to about 6 carbon atoms.

As indicated above, the unsaturated comonomer or supplemental monomer is present in a minor amount relative to the other components, such as the hydroxyl-containing unsaturated monomer and solvent employed. Suitably, the ratio of concentrations, in parts by weight, of hydroxyl-containing monomer to supplemental monomer is at least about 4 to 1, preferably at least about 10 to 1 and most preferably about 20 to 1.

The supplemental monomers of the present invention are limited to those monomers containing only a single ethylenically unsaturated group or monomers which do not contain groups that react with the same or other groups present in the polymer chain. The supplemental monomers which are suitable for use in the present invention contain no groups (other than the single ethylenically unsaturated group believed to react with the unsaturated group of the hydroxyl-containing monomer) which react with any group, particularly the hydroxyl groups of the hydroxyl-containing monomers or polymers formed therefrom under manufacturing conditions. These conditions include the processes and steps of polymerization and grafting as well as drying, sealing and all other operations involved in filter and filter unit manufacture. It is believed that under polymerization conditions the mixture of hydroxyl-containing unsaturated monomers and supplemental monomers forms a non-crosslinked copolymer which is grafted to the surface of the PVDF, substrate, much the same as the surface-modifying homopolymers discussed above.

In addition to the structural features designated above, suitable monomers used to form the surface-modifying polymeric material, both as the major and the minor component, may be further characterized by their properties, such as responding to ionizing radiation by forming a free radical. Suitable monomeric compounds should also be substantially completely, if not totally, soluble in the solvent systems employed in the present invention. A solvent or solvent system is employed, which is inert to polymerization conditions, will maximize solubility and not adversely affect the polymeric substrate nor the monomer employed, while permitting a satisfactory polymerization. Preferred solvents include polar solvents, particularly hydroxylated solvents such as water, lower aliphatic alcohols, such as ethanol, and mixtures thereof. If a water-miscible solvent is required for complete solubility of the monomer(s), water-miscible tertiary alcohols are preferred with aqueous tert-butyl alcohol being the preferred solvent system. Useful concentrations range between about 5 to about 40%, by weight, of tert-butyl alcohol with a concentration of about 15 to about 30% being preferred.

Solutions of the hydroxyl-containing monomer compound used in the present invention range in concentration of the monomer(s) from about 0.1 to about 5.0 percent, by weight, preferably about 0.2 to about 3.0 percent, by weight, based on the total weight of solution. When PVDF is employed as the substrate material, generally the concentration of hydroxyl-containing monomer ranges from about 1.5 to about 2.5 percent by weight, most preferably about 1.8 to about 2.25 percent by weight based on the total weight of solution. The concentration of the second or surface-modifying polymeric material in the medium and, therefore, the concentration of the monomer in the solution used to form the second polymeric material is selected so as to provide the porous polymeric medium with a substantially lower affinity for proteinaceous materials. However, a concentration sufficiently high to result in "plugging" of the substrate so as to adversely affect the flow properties of the media is to be avoided.

The particular procedure used to saturate the porous polymeric substrate is not particularly critical as long as the substrate is thoroughly and uniformly saturated and methods known to one of skill in the art may be employed. For example, in a batch process, a portion of the substrate may be immersed in a solution of the monomer compounds used to form the second or hydroxyl-containing polymer for sufficient time to "saturate" or impregnate the polymeric substrate, i.e., penetrate the pores of the substrate. In some instances, it may be desirable to immerse an entire wound roll of medium in a vessel containing the monomer solution or, alternatively, monomer-containing solution may be passed through the wound roll of medium. In a continuous process, the substrate is passed through the solution of components for a sufficient "residence" time to saturate the substrate.

When a hydrophilic porous polymeric substrate is employed to prepare the porous polymeric media, no pretreatment is required. However, when a liquophobic, particularly hydrophobic, material, such as PVDF, is employed as the substrate, it must be wetted prior to saturation or impregnation with the monomer-containing solution. Wetting may be accomplished by contacting the hydrophobic substrate with a liquid, such as water, containing a wetting agent or with a water miscible liquid having a lower surface tension than water, such as a lower aliphatic alcohol, particularly ethanol or butanol, such as t-butanol, or a mixture of ethanol or butanol (and particularly t-butanol) and water. In those situations in which the liquid or solution used to wet the hydrophobic polymeric substrate interferes with the grafting step, the wetting agent may be displaced from the substrate by contacting and saturating the substrate with the solvent in which polymerization is conducted, such as water, providing that the two liquids are substantially miscible. Thereafter, the solvent-saturated, preferably water-saturated, hydrophobic substrate may be contacted with the monomer solution in the same manner as a hydrophilic substrate would be contacted with monomer solution. Alternatively, the monomer solution employed may be prepared with a solvent system, such as an aqueous solvent system, containing a low concentration of a water-miscible, lower surface tension solvent, such as an alcohol, which alcohol does not adversely affect the grafting step, thereby promoting wetting and impregnation of the substrate.

The preferred manner of irradiating the surface of the porous or microporous polymeric substrate, which also includes retained monomer solution, depends to some extent on the type of ionizing radiation to which the surface-treated polymeric membrane is exposed. If the preferred method, gamma radiation, is employed, it is frequently preferred to treat the membrane in bulk, that is, for example, a wound roll of the monomer treated polymeric substrate is commonly irradiated. With this procedure, prior to irradiation the membrane material may typically be unwound, passed through a monomer-containing solution, and then rewound, or, alternatively, the entire roll of membrane material may be immersed in the monomer-containing solution. When polymerization and grafting are accomplished by exposure to ionizing ultraviolet radiation, a continuous procedure is preferred. In this instance, a typical procedure involves passing a microporous membrane material through a monomer-containing solution and then passing the monomer treated porous membrane material to an irradiation zone.

When gamma radiation is the energy source employed to effect polymerization, in the preferred procedure, the roll of polymeric substrate saturated with monomer solution, is "degased"; that is, the monomer solution-containing roll is treated in some manner so as to remove the air which is present in the solution. This may be accomplished by a procedure which involves displacing the air with an inert gas, such as helium, argon, krypton, etcetera, or, preferably, by subjecting the monomer solution-containing roll to reduced pressure. Thereafter, the roll may be suitably sealed in an air-free package until it is ready to be irradiated. When the substrate employed is dry PVDF (having no monomer present), the substrate may be placed within an irradiation container, the container evacuated and the monomer solution added. It does not appear to make a significant difference if the solution is not degased prior to introduction to the container or the container degased after addition of the monomer solution thereto. Since the monomer solution-containing polymeric porous membrane is irradiated directly in the package or container, a packaging or container material is selected which does not significantly impede penetration by gamma radiation but is resistant to the degradative effects thereof. Suitable packaging materials may include many plastics, thin metal (other than lead) sheets, and borosilicate glass.

A suitable dosage of gamma radiation will be sufficient to effect polymerization and formation of covalent bonds between the polymeric substrate and the hydroxyl-containing surface-modifying polymer but insufficient to cause the hydroxyl-containing surface-modifying material to block the pores of the media to the extent that the flow properties of the membrane material are adversely affected. In other words, the pressure drop across the treated or modified membrane is not noticeably greater than that of the untreated substrate. Suitably, a dosage of about 0.2 to about 10 megarads is employed. Suitably, an exposure of from about 5 to about 500 kilorads/hr, preferably about 5 to about 150 kilorads.hr, and most preferably about 5 to about 70 kilorads/hr, is used for a typical irradiation period of about 4 to about 60 hours. A dose rate of about 10 kilorads/hr and a total dose of about 0.2 megarads is especially preferred for grafting to a PVDF membrane.

When the energy source for the ionizing radiation used to form the second polymeric material at the surface of the substrate is ultraviolet radiation, the impregnated media are typically exposed to ultraviolet radiation of suitable frequency and intensity to effect polymerization of the monomer compound and grafting of the polymer to the substrate media. This will vary to some extent with the monomer, the substrate, and conditions employed. Typically, the latter includes an emission in the range of about 180 to about 420 nanometers. Lamp intensity is typically about 100 to about 200 watts/cm$^2$.

Any UV source which emits light in wavelengths suitable for the present invention and does not at the same time produce an excessive amount of heat may be used. A preferred source of UV radiation is a medium pressure, ozone-free mercury lamp, such as that manufactured by American Ultraviolet Company, Model C10012A. Although many irradiation sources and arrangements may be employed in the present invention, an arrangement which has been shown to be effective is one which employs an aluminum housing having an integrated reflector design, the reflector having an elliptical cross-section. When used in the present invention, the mercury lamp is located at one focal point of the ellipse and the substrate-impregnated surface is positioned at or in the vicinity of the other focal point. As indicated above, the distance of the lamp to the membrane has an effect on the polymerization and grafting of the acrylic monomers. Depending upon the type of ultraviolet light source or lamp employed, a suitable distance from the surface being irradiated is about ¼ to about 8 inches, preferably about ¾ to about 6 inches, and most preferably about 4 ½ inches.

In a continuous operation, the line speed of the moving medium will depend at least in part on such factors as the distance of the impregnated substrate from the ultraviolet light source, the temperature within the housing in which irradiation is conducted, and the composition of the solvent system. A preferred line speed is one effective in producing the surface-modified product and typically is about 5 to about 50 feet per minute, preferably between about 20 and about 30 feet per minute. Line speeds within these ranges are most effective in producing media which are most readily wetted with water. The impregnated membrane is irradiated for a period of from about ½ to about 2 seconds, preferably about 1 second.

Regardless of the radiation technique employed, the surface-modified porous polymeric media must be thoroughly rinsed to remove substantially all residual monomer and polymer which is not covalently bound to the polymeric substrate. Any technique which accomplishes this purpose and generally known to the art, such as batch-wise soaking of the membrane followed by draining, passing the washing agent or solvent through the porous membrane, or exchanging water or water/alcohol mixtures, may typically be employed.

The preferred washing agent is water, particularly deionized water, although the same solvent system used to form the monomer solution may also be used. The washing procedure may be conducted adequately at about ambient temperature.

After washing, the medium may be dried by conventional means used in processing such media. Examples of suitable techniques include the use of an enclosed oven, an infrared oven, a tunnel oven or by contact between the surface-modified substrate and a heated metal drum. When batch drying is performed on smaller portions of the treated medium, shrinkage may be reduced by securing the medium to a frame before drying. As an alternative to drying, the media may be stored wet or processed further.

Hydrophilic porous polymeric media produced according to the present invention demonstrate high fluid-permeability. More significantly, however, as the examples show, these media have protein adsorption levels, as determined by the Bovine Serum Albumin Protein Adsorption Test, of about 50% to about 1%, typically about 20% to about 1.5%, of the untreated substrate.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents and alternatives falling within the spirit and scope of the invention.

EXAMPLES

Example 1 —Preparation of a Monomer Solution

An aqueous solution of 3-hydroxypropyl acrylate (HPA) (Rocryl TM 430 from Rohm and Haas) was prepared by adding 2 parts HPA to a solvent system containing, by volume, 96 parts of deionized water and 2 parts tertiary butyl alcohol. The solution was stirred until uniformly mixed, producing a 2%, by volume, concentration of HPA.

Example 2 —Preparation of a Microporous Nylon Medium Having a Low Affinity for Proteinaceous Material A 200 foot ×10 inch roll of microporous nylon 66 (ULTIPOR $N_{66}$, available from Pall Corporation) was contacted with the 2.0 volume percent solution of hydroxypropyl acrylate prepared in Example 1. The microporous nylon substrate, in roll form, was immersed in the monomer solution and allowed to become completely saturated. No attempt was made to remove excess solution from the roll. The saturated roll was transferred to and sealed in an irradiation chamber, specifically a stainless steel vessel having a wall thickness of 0.030 inch.

The roll was exposed to gamma radiation at a dose rate of 25,000 rads/hour for a total of 60 hours for a total dose of 1.5 megarads. The roll was then removed from the vessel and washed to remove residual monomer and ungrafted polymer by allowing deionized water to circulate around the roll for 24 hours. A small section of medium was removed from the roll, clamped in a frame, and dried for 15 minutes at 100 degrees C. for subsequent testing.

Example 3 —Bovine Serum Albumin (BSA) Protein Adsorption Test

The BSA protein adsorption test is performed according to a standardized procedure. In this procedure, a solution containing 0.1 mg/ml unlabeled BSA and about $10^5$ cpm/ml $^{125}$I-labelled BSA was prepared in a phosphate buffered saline (PBS) solution contained 0.2 grams per liter of monobasic sodium phosphate, and 8.77 grams per liter sodium chloride in deionized water.

A sample of a porous test medium was placed in a syringe-type filter holder. Fluid communication between a reservoir holding the BSA test solution and the syringe-type filter was provided by a length of Tygon (Registered Trademark) tubing and a peristaltic pump arranged in series. Prior to insertion of a porous test medium sample into the filter holder, the potential non-specific protein binding sites on both the tubing and the filter holder were blocked by recirculating 1.0 ml of the BSA solution through the tubing and filter holder at a flow rate of 0.3 ml/min for a period of 15 minutes. Following recirculation, the BSA solution was drained from the tubing and filter holder. Residual BSA solution was removed from the tubing and filter holder by circulating about 2.0 ml of PBS through the tubing and filter holder at a flow rate of about 0.3 ml/min for several minutes at ambient temperature.

A 13 mm diameter disc of porous polymeric test medium was placed into the blocked filter holder. The $^{125}$I-BSA solution was then transferred from the reservoir to the filter holder at a flow rate of 0.8 ml/min/cm$^2$. The test was continued for a period of 5 minutes, during which time 391 micrograms/cm$^2$ of BSA were transferred to the filter holder. The test medium was then removed from the filter holder and blotted dry on filter paper. The amount of protein (BSA) adsorbed by the membrane disc was determined by radioactive counting in a gamma counter. The results reported in Table I are for untreated membranes and membranes treated according to Examples 1 and 2 to provide a porous medium having a low affinity for proteinaceous material. These results indicate the amount of BSA adsorbed by the membrane divided by the effective filtration area.

TABLE 1

| BSA PROTEIN ADSORPTION FOR SURFACE-MODIFIED AND UNMODIFIED NYLON MEDIA | |
| --- | --- |
| Product of Examples 1 and 2 | 2.2 micrograms/cm$^2$ |
| Untreated Membrane Employed in Example 2 | 242 micrograms/cm$^2$ |

Example 4 —Permanence of Polymerization and Grafting Treatment

Porous polymeric filter membranes prepared according to Examples 1 and 2 were subjected to extensive washing with water at 34 degrees C. at the flow rates indicated in Table 2. Thereafter, the membranes were tested for BSA protein adsorption with the results set forth below.

TABLE 2

| | PERMANENCE OF SURFACE-MODIFIED POLYMERIC MATERIAL | |
|---|---|---|
| Flow Rate (liters/minute/Ft$^2$) | Total Water Passed (liters/ft$^2$) | BSA Protein Adsorption (micrograms/cm$^2$) |
| 2 | 80 | 2.5 |

The above results suggest that a procedure for forming a grafted porous polymeric media employing covalently bound groups rich in hydroxyl content, such as the hydroxypropyl acrylate used in Examples 1 to 3, results in a membrane having a relatively permanently bound low-affinity material with respect to washing with water.

Example 5 —Preparation of a Microporous Polyvinylidene Difluoride Medium Having a Low Affinity for Proteinaceous Material A continuous length of hydrophobic polyvinylidene difluoride (PVDF) membrane having a removal rating of about 0.65 micrometers, cast by Pall Corporation on a non-woven polyester support web, was interleafed with a 2.7 g/ft$^2$ polypropylene non-woven web having an apparent density of 3000g/ft$^3$ (0.11 g/cm$^3$) and rolled in corrugated or pleated form around a hollow cylindrical core. The polypropylene non-woven web was used to promote flow of monomer solution through the rolled media. The roll was placed in a cylindrical stainless steel vessel having a tight-fitting cover and provided with an O-ring seal. The seal was sufficient to enable the container to be evacuated and maintain vacuum inside the container. The cover was designed in such a manner that liquid could be pumped through the cover into the vessel, through the roll of membrane from side to side (through the interleaf and across the membrane surface), and be vented from the vessel. After the vessel was loaded with the roll of membrane it was covered and sealed, and evacuated by means of a vacuum pump until the pressure inside the vessel was about 200 micrometers of mercury.

The vessel was disconnected from the vacuum pump without admitting air into the vessel. Then a solution containing 2.5 weight percent hydroxypropyl acrylate (HPA) and 97.5 weight percent of a mixture of 15 parts by weight tert-butyl alcohol and 85 parts by weight water was pumped into the evacuated vessel and through the roll of membrane. The solution was allowed to flow through the roll for an additional period of 15 minutes after the vessel was full. The vessel was then disconnected from the supply of HPA solution and sealed. The sealed vessel with the membrane and HPA solution was then exposed to gamma radiation from a $^{60}$Co source at a rate of 10 kilorads per hour for 20 hours.

After being exposed to radiation the roll of membrane was removed from the vessel and washed by flowing deionized water tangentially across the web through the roll. This was accomplished by first placing the roll on its side and spirally wrapping a solid polyester film completely around the roll so that it formed a cylinder with one edge of the film flush with the edge of the roll and the other edge about 18 inches above the top edge of the roll. The core around which the web was rolled was then plugged and the space above the roll formed by the cylindrical wrap of film was filled with deionized water. The water flow was maintained at such a rate that a head of about 18 inches of water was maintained throughout the washing period, which was about 16 hours.

After being washed, a section of the membrane was dried in a restraining frame for 10 minutes in an air oven at 100° C. The dry membrane was found to be wetted with water in about 4 seconds when a small piece (about 6"×6") was placed on the surface of water in an open dish, indicating that the surfaces of the pores of the membrane had been covered with hydrophilic material causing the membrane to be hydrophilic. However, when tested for water flow properties, it was found that the membrane was partially plugged by grafted polymer, since the membrane had a water permeability of 6.5 1/min/ft$^2$/psi compared with 11.1 1/min/ft$^2$/psi for a sample of the same membrane before treatment, i.e., a 42% loss in permeability resulted from the surface treatment. When tested for protein adsorbability according to the BSA Adsorption Test the membrane had a protein adsorbability of 2.7 μg/cm$^2$, a very substantial reduction from that of the same membrane before treatment. This information is summarized in Table 3 below.

Example 6 —Preparation of a Microporous Polyvinylidene Difluoride Medium Having a Low Affinity for Proteinaceous Material A continuous length of hydrophobic PVDF having a removal rating of about 0.65 micrometers, cast by Pall Corporation on a non-woven polyester web, was treated as described in Example 5, except that the concentration of HPA in the solution was 1.95 weight percent.

After being washed and dried the membrane could be wetted in about 2 minutes when tested as described in Example 1 and had a water permeability of 14 1/min/ft$^2$/psi, equal to the permeability of a sample of the untreated hydrophobic membrane. When tested for protein adsorbability according to the BSA Adsorption Test the membrane had a protein adsorbability of 3.1 μg/cm$^2$, about the same as that of the membrane of Example 5, and very greatly reduced from that of the same membrane before treatment. This information is summarized in Table 3 below.

Example 7 - Preparation of a Microporous Polyvinylidene Difluoride Medium Having a Low Affinity for Proteinaceous Material A continuous length of hydrophobic PVDF membrane having a removal rating of about 0.65 micrometers, cast by Pall Corporation on a non-woven polyester web, was treated as described in Example 5, except that the concentration of HPA in the solution was 1.65 percent, by weight.

After being washed and dried the membrane could be wetted in about 3 minutes when tested as described in Example 5 and had a water permeability of 14 1/min/ft$^2$/psi, equal to that of a sample of untreated hydrophobic membrane. When tested for protein adsorbability according to the BSA Adsorption Test the membrane had a protein adsorbability of 3.1 μg/cm$^2$, essentially the same as that of the membrane of Example 5, and very greatly reduced from that of the same membrane before treatment. This information is summarized in Table 3 below.

TABLE 3

MICROPOROUS POLYVINYLIDENE DIFLUORIDE MEDIA HAVING MODIFIED POLYMERIC SURFACES DERIVED FROM HYDROXYPROPYL ACRYLATE MONOMER

| Membrane of Ex. | HPA % | Wetting Time | Loss in $H_2O$ Permeability (%) | Protein Adsorption ($\mu g/cm^2$) |
|---|---|---|---|---|
| 5 | 2.50 | 4 sec | 42% | 2.7 |
| 6 | 1.95 | 2 min | 0% | 3.1 |
| 7 | 1.65 | 3 min | 0% | 3.1 |
| Control:untreated hydrophobic PVDF membrane | | | | 96.5 |

Examples 8–11 demonstrate that small amounts of other monomers whose homopolymers do not necessarily show low protein adsorbability may be copolymerized with HPA on a PVDF substrate and yield membranes having protein adsorbability as low as or lower than that of membranes made using HPA alone.

Example 8 —Preparation of a Microporous Polyvinylidene Difluoride Medium Having a Low Affinity for Proteinaceous Material Using a Surface-modified Polymer Formed from HPA and Methyl Methacrylate A piece of hydrophobic microporous polyvinylidene difluoride membrane having a pore size of 0.65 micrometers, cast by Pall Corporation on a non-woven polyester support, was immersed in a solution containing 2.0 weight % HPA and 0.01 weight % methyl methacrylate (obtained from Rohm and Haas Corporation as catalogue No. 605486) and 98.0 weight percent of a mixture of 15 parts by weight tert-butyl alcohol and 85 parts by weight water. While immersed in the solution the membrane was exposed to gamma radiation from a $^{60}Co$ source at a rate of 10 kilorads/hr for 20 hours. After being irradiated the membrane was removed from the solution, was rinsed off with running deionized water and was dried in an air oven at 100° C. for 10 minutes.

The dried membrane was tested for protein adsorbability by the BSA Adsorption Test and showed a protein adsorbability of 2.3 $\mu g/cm^2$, slightly less than that of the membrane of Example 6, which was made using 1.95% by weight HPA without the use of methyl methacrylate. This is summarized in Table 4 below.

Example 9 —Preparation of a Microporous Polyvinylidene Difluoride Medium Having a Low Affinity for Proteinaceous Material Using a Surface-modified Polymer Formed from HPA and Methyl Methacrylate A piece of hydrophobic microporous polyvinylidene difluoride membrane having a pore size of 0.65 micrometers, cast by Pall Corporation on a non-woven polyester support, was treated as described in Example 8 except that the concentration of methyl methacrylate used was 0.1 weight %.

After being washed and dried the resultant membrane was tested for protein adsorbability by the BSA Adsorption test and showed a protein adsorbability of 1.2 $\mu g/cm^2$, even less than that of the medium of Example 8, despite the fact that more of the non-hydroxylated monomer was used. This information is summarized in Table 4 below.

Example 10 —Preparation of a Microporous Polyvinylidene Difluoride Medium Having a Low Affinity for proteinaceous Material Using a Surface-modified Polymer Formed from HPA and Methyl Methacrylate A piece of hydrophobic microporous polyvinylidene difluoride membrane having a pore size of 0.65 micrometers, cast by Pall Corporation on a non-woven polyester support, was treated as described in Example 8, except that the concentration of methyl methacrylate used was 0.5 weight percent.

After being washed and dried the resultant membrane was tested for protein adsorbability by the BSA Adsorption Test and showed a protein adsorbability of 1.2 $\mu g/cm^2$, the same as that of the medium of Example 9, indicating that a further increase in the concentration of methyl methacrylate used had no added effect in reducing protein adsorbability. This information is summarized in Table 4 below.

Example 11 —Preparation of a Microporous Polyvinylidene Difluoride Medium Having Low Affinity for Proteinaceous Material Using Surface-modified Polymer Formed from HPA and Methacrylic Acid A piece of hydrophobic microporous polyvinylidene difluoride membrane having a pore size of 0.65 micrometers, cast by Pall Corporation on a non-woven polyester support, was treated as described in Example 9 except that the comonomer used was methacrylic acid (obtained from Rohm and Haas Corporation as catalogue No. 6-5646) instead of methyl methacrylate.

After being washed and dried the resultant membrane was tested for protein adsorbability by the BSA Adsorption Test and showed a protein adsorbability of 2.3 $\mu g/cm^2$, slightly lower than that of the membrane of Example 6, which was made using 1.95% by weight of HPA without the use of a comonomer. This is summarized in Table 4 below.

Example 12 (Comparative) —Preparation of a Microporous Polyvinylidene Difluoride Medium Using a Surface-Modified Polymer Formed from Acrylic Acid and Diethylene Glycol Dimethacrylate A continuous length of hydrophobic PVDF membrane having a removal rating of about 0.65 micrometers cast by Pall Corporation on a non-woven polyester support web, was interleafed with a 2.7 $g/ft^2$ polypropylene non-woven material having an apparent density of 0.1 $g/cm^3$. The medium was treated as described in Example 5 except that instead of the PVDF medium being treated with an HPA solution, it was contacted with a solution containing 0.4%, by weight, diethylene glycol dimethacrylate (DEGDMA), (a product of Sartomer described in their catalogue as #SR-231), 0.6%, by weight, of acrylic acid (a product of Rohm & Haas described in their catalogue as #6-5290), and 99.0 weight percent of a mixture of 30 parts by weight tert-butyl alcohol and 70 parts by weight water. The dry membrane was found to be wetted with water in about 2 seconds when a small piece (about 6"×6") was placed on the surface of water in an open dish, indicating that the surfaces of the pores of the membrane had been covered with hydrophilic material causing the membrane to be hydrophilic. However, when tested for water flow properties, it was found that the membrane was partially plugged by grafted polymer, since the membrane had a water permeability of 5.4 l/min/ft$^2$/psi, compared with 12.2 l/min/ft$^2$/psi for the same membrane before treatment, i.e., a 55% loss in permeability. When tested for protein adsorbability according to the BSA Adsorption Test the membrane had a protein adsorbability of 119.9 μg/cm$^2$, even greater than that of the same membrane before treatment, demonstrating that a PVDF membrane surface populated with acrylic acid monomers, without hydroxyl monomers shows high level of protein adsorption. This information is summarized in Table 4.

We claim:

TABLE 4

| Membrane of Example | HPA % | Comonomer | Conc. of Comonomer (%) | Protein Adsorbability (μg/cm$^2$) |
|---|---|---|---|---|
| 6 | 1.95 | none | — | 3.1 |
| 8 | 2.0 | methyl methacrylate | 0.1 | 2.3 |
| 9 | 2.0 | methyl methacrylate | 0.1 | 1.2 |
| 10 | 2.0 | methyl methacrylate | 0.5 | 1.2 |
| 11 | 2.0 | methacrylic acid | 0.1 | 2.3 |
| 12 | — | DEGDMA & acrylic acid (respectively) | 0.4, 0.6 | 119.9 |

1. A porous polymeric medium having a low affinity for amide group-containing materials comprising:
   a porous polyvinylidene difluoride substrate; and
   a surface-modifying polymeric material having a low affinity for amide group-containing materials formed in situ at and covalently bonded to the surface of said polyvinylidene difluoride substrate, said surface-modifying polymeric material being derived from a monofunctional monomer having at least one hydroxyl group.

2. The porous polymeric medium of claim 1 wherein said surface-modifying polymeric material is bonded directly to the surface of said porous polyvinylidene difluoride substrate.

3. The porous polymeric medium of claim 1 wherein said monomer from which said surface-modifying polymeric material is derived, comprises an unsaturated compound.

4. The porous polymeric medium of claim 3 wherein said surface-modifying polymeric material is derived from a combination of said unsaturated monofunctional monomer having at least one hydroxyl group and a minor amount of a supplemental unsaturated monomer.

5. The porous polymeric medium of claim 4 wherein said supplemental unsaturated monomer comprises a monomer whose homopolymer exhibits a high affinity toward amide group-containing materials.

6. The porous polymeric medium of claim 4 wherein said supplemental unsaturated monomer contains an ionic or ionizable group in addition to said unsaturated group.

7. The porous polymeric medium of claim 6 wherein said supplemental unsaturated monomer comprises a carboxylic acid, sulfonic acid or a phosphonic acid.

8. The porous polymeric medium of claim 6 wherein said supplemental unsaturated monomer comprises an unsaturated carboxylic acid.

9. The porous polymeric medium of claim 8 wherein said supplemental unsaturated monomer comprises acrylic or methacrylic acid.

10. The porous polymeric medium of claim 4 wherein said supplemental unsaturated monomer includes a hydrophobic group in addition to said unsaturated group.

11. The porous polymeric medium of claim 10 wherein said hydrophobic group comprises a lower alkyl group.

12. The porous polymeric medium of claim 10 wherein said supplemental unsaturated monomer comprises an alkyl acrylate or methacrylate.

13. The porous polymeric medium of claim 10 wherein said supplemental unsaturated monomer comprises methylmethacrylate.

14. The porous polymeric medium of claim 1 wherein said monomer from which said surface-modifying polymeric material is derived comprises an ethylenically unsaturated compound.

15. The porous polymeric medium according to claim 14 wherein said monomer is an hydroxyalkyl acrylate or methacrylate.

16. The porous polymeric medium according to claim 15 wherein the hydroxyalkyl group contains 2 to 5 carbon atoms.

17. The porous polymeric medium according to claim 14 wherein said monomer is 2-hydroxyethyl acrylate, 2-hydroxyethyl methacrylate, 3-hydroxyprop-2-yl acrylate, 3-hydroxyprop-2-yl methacrylate, 2-hydroxypropyl acrylate, 2-hydroxypropyl methacrylate or mixtures of at least two the foregoing monomers.

18. The porous polymeric medium according to claim 14 wherein said monomer is at least one of 3-hydroxyprop-2-yl acrylate and 2-hydroxypropyl acrylate.

19. The porous polymeric medium according to claim 14 wherein said monomer is at least one of 3-hydroxyprop-2-yl methacrylate and 2-hydroxypropyl methacrylate.

20. The porous polymeric medium according to claim 14 wherein said monomer is hydroxyethyl methacrylate.

21. The porous polymeric medium of claim 1 wherein said surface modifying polymeric material comprises a material rich in pendant hydroxyl groups.

22. The porous polymeric medium of claim 1 wherein said porous polyvinylidene difluoride is microporous.

23. The porous polymeric medium of claim 1 wherein said porous polyvinylidene difluoride substrate and said medium are microporous.

24. The porous polymeric medium of claim 1 wherein said amide group-containing material comprises proteinaceous material.

25. The porous polymeric medium of claim 24 wherein said medium has an adsorption of proteinaceous material measured by the Bovine Serum Albumin Adsorption Test of less than 100 micrograms per square centimeter.

26. The porous polymeric medium according to claim 1 wherein said monomer is a monomer capable of polymerizing and forming a polymer and covalently bonding to said porous polyvinylidene difluoride substrate under the influence of ionizing radiation.

27. The porous polymeric medium according to claim 1 wherein said polyvinylidene difluoride substrate and said medium are microporous, said monomer is 2-hydroxypropyl or 3-hydroxyprop-2-yl methacrylate or hydroxyethyl methacrylate and said medium has an adsorption of proteinaceous material as measured by the Bovine Serum Albumin Adsorption test of less than 100 micrograms/cm$^2$.

28. A method of producing a porous polymeric medium having low amide group-containing sorbability comprising:

contacting a porous polyvinylidene difluoride substrate with a solution of a monofunctional monomeric compound having at least one hydroxyl group and capable of forming a polymer having a low affinity for amide group-containing material; and exposing said polyvinylidene difluoride substrate and said monomeric compound to ionizing radiation to effect polymerization of said monomeric compound at the surface of said substrate to form said medium.

29. The method of producing a porous polymeric medium of claim 28 wherein said monofunctional monomeric compound having at least one hydroxyl group comprises an ethylenically unsaturated compound and said solution includes a major amount of said monofunctional monomeric compound and further includes a minor amount of supplemental unsaturated monomer.

* * * * *

UNITED STATES PATENT AND TRADEMARK OFFICE
CERTIFICATE OF CORRECTION

PATENT NO. : 5,019,260
DATED : May 28, 1991
INVENTOR(S) : Gsell et al.

It is certified that error appears in the above-indentified patent and that said Letters Patent is hereby corrected as shown below:

Col. 17, line 12, delete "We claim:".
Col. 17, line 28, insert "We claim:".

Signed and Sealed this

Nineteenth Day of July, 1994

*Attest:*

BRUCE LEHMAN

*Attesting Officer*     Commissioner of Patents and Trademarks